United States Patent [19]

Friedman et al.

[11] Patent Number: 4,730,308
[45] Date of Patent: Mar. 8, 1988

[54] INTERFACE BETWEEN A COMPUTER BUS AND A SERIAL PACKET LINK

[75] Inventors: Lee G. Friedman, Cronton-on-Hudson; Brent T. Hailpern, Katonah, both of N.Y.

[73] Assignee: International Business Machines Corporation, Armonk, N.Y.

[21] Appl. No.: 784,441

[22] Filed: Oct. 4, 1985

[51] Int. Cl.⁴ ............................. H04J 3/02; H04J 3/24
[52] U.S. Cl. ........................................ 370/85; 370/94; 370/110.1
[58] Field of Search .................. 370/85, 89, 94, 944, 370/24, 29, 110.1, 60

[56] References Cited

U.S. PATENT DOCUMENTS 4,412,326  10/1983  Limb .................................. 370/85
4,439,763  3/1984  Limb .................................. 370/85

Primary Examiner—Douglas W. Olms
Assistant Examiner—Curtis Kuntz
Attorney, Agent, or Firm—Sughrue, Mion, Zinn, Macpeak, and Seas

[57] ABSTRACT

An interface between a bus-oriented computer and a packet-based serial link. A block of data is transferred from the serial link to a buffer, whereupon the bus is issued a request for service. When the bus has read the buffer, the serial link carries an acknowledgement of the reading. If the buffer has not been read, no further block of data is transferred into it. The bus also writes a block of data into another buffer from which it is sent over the serial link if the previous such block has been acknowledged.

8 Claims, 5 Drawing Figures

INTERFACE BETWEEN A COMPUTER BUS AND A SERIAL PACKET LINK

DESCRIPTION

1. Technical Field

The invention relates generally to a computer interface. In particular, the invention relates to an interface between a bus oriented computer and a link over which bytes are transmitted in packets.

2. Background Art

The PC computer, manufactured and sold by the International Business Machine Corporation, is an example of a typical computer architecture that relies upon the use of a bus for the transmission of data between various components of the computer. This computer is described in detail in "IBM Personal Computer Technical Reference", available from the IBM Corporation as Part Number 1502234. Associated with the bus are two control lines, −IOR and −IOW and an address bus which can be used for addressing an I/O port to which a peripheral device is attached. The processor is typically in control of the bus. When it desires to send or receive data from some peripheral device connected to the bus, it addresses the device and then issues a read command on the −IOR line or a write command on the −IOW line. Both the −IOR and −IOW lines are included in the bus and are connected to each of the I/O ports. The addressed device recognizes its address and prepares itself to perform appropriate action for the indicated command. Some peripheral devices can only be read from, others can only be written to, while others, such as bulk memories or terminals, can operate in both modes. For instance, if the peripheral device is a disk unit, data may be transmitted in either direction between the disk unit and the processor. If the read command has been issued, the peripheral device will present a byte of data to the data bus for reading by the processor. If the write command has been issued, the processor will put the data on the data bus and the memory will read it from the bus and store it in the addressed memory location.

Often, a peripheral device will be operating independently of the processor. When such a peripheral device wishes to use the data bus for transmitting data between itself and the processor, the peripheral device issues an interrupt request on one of several interrupt lines of the bus. The processor eventually responds to the interrupt request by some combination of read and write operations. Thus it is seen in this type of computer architecture that the peripheral device responds to a request from the processor by the I/O address and the RD and WR lines. The processor, in turn, responds to a request from the peripheral over the interrupt lines.

Another type of data transfer on a computer bus is a direct memory access (DMA). Under certain conditions, the DMA controller, often a separate device from the processor, takes control of the bus and causes data to be transferred between two peripheral devices connected to the bus. For example, in DMA data may be transferred between a disk and a random access memory. One use of DMA is for the DMA controller to steal cycles from the processor when the processor is busy performing an internal task. On the bus of the IBM PC, there are provided separate lines for requesting DMA service and for acknowledging a DMA request.

There are other types of intelligent devices which communicate over serial links. Typically, a serial link constitutes a pair of single lines, one line of the pair being an input path and the other line being an output path. Data is sent and received in packets of data and accompanying information. A packet contains sufficient information to indicate the nature of the data being transmitted and provides its own delimiters. That is, a packet is transmitted as an entity and received as an entity. The devices linked by the serial link are not tightly coupled and the timing of the packets is very loose. To avoid lost packets and overwhelming a receiver with an excessive number of packets, a packet oriented communication system can require that no further data be sent over a link until the receipt of the previous packet is acknowledged in the reverse direction over the serial link. Such serial links typically operate at very high clock rates, much higher than the clock rates of a computer bus.

A problem arises when a device that is designed to operate over a serial link needs to be connected to a computer that is based on a bus. An interface needs to be provided between the serial link and the bus. The circuitry associated with the interface is an unavoidable problem but it is of course desirable that it be minimized. A more significant problem is that the communication protocol on the computer bus is significantly different from the communication protocol on the serial link. The software of the computer could be modified to make the computer bus conform to the conventions of the serial link. However, this would slow down the operation of the processor during any I/O operations with the serial link and would enlarge the required operating system. Furthermore, an I/O operation to the serial link would need to invoke the specialized software rather than the more common bus oriented read and write operations, which are single operation codes. Finally the serial link would be restrained by the speed of the computer bus, which is usually much slower, particularly when the control information included in the packet is considered.

In designing the interface, it is also desired that the device attached to the serial link not be required to be linked to the interface by additional control lines or that additional control information be required to be transmitted over the serial link. That is, it is desired that the packet protocol be maintained as far as the attached device is concerned.

There exists much prior art for computer interfaces and even for interfaces between serial links and a bus based computer. In perhaps the most common approach, the serial link writes a word into a buffer in the interface and the processor regularly polls the interface to determine if there is fresh data waiting to be read. Such interfaces are disclosed by Misunas in U.S. Pat. No. 4,174,536, by Grudowski in U.S. Pat. No. 4,404,651 and by Dunning et al in U.S. Pat. No. 4,145,739.

Another class of interfaces use a DMA (direct memory access) module which acts as an interface between the bus and the external world and data passes through the DMA module. The module is under the control of the processor. Larson et al in U.S. Pat. No. 4,079,452 and Davis et al in U.S. Pat. No. 4,075,691 are examples of this approach. Murakama in U.S. Pat. No. 4,467,420 uses a DMA controller only to output data to a parallel port.

The interface could operate under the control of the processor, as described by Daniels in U.S. Pat. No. 4,395,756, but this would impact both the system software and constrain the operation of the serial link to the processor's operation.

Wadner in U.K. Patent Application No. 2,097,565A describes a serial bus connected to many computer buses by respective interfaces. Whenever the serial bus writes a word into a particular interface, the interface interrupts the associated processor to request servicing, that is, reading of the data. However, Wadner's interface suffers the disadvantage that if the buffer is full, the serial bus can nonetheless attempt to write another word therein. In this situation, the second word is not received.

SUMMARY OF THE INVENTION

Accordingly, it is an object of the invention to provide an interface between a computer bus and a serial link.

It is another object of the invention to provide a simple interface.

It is a further object of the invention to provide an interface that is compatible with the protocols of both the computer bus and the serial link.

The invention can be summarized as an interface between a computer bus and a packet oriented serial link in which the computer bus writes to an output register and reads from an input register. As soon as data is written into the output register, the data is serialized and converted to packet form and transmitted over the outbound serial link. When the inbound serial link transmits a packet, the data is deserialized and put into the input register if an input register full flag is not set. The flag is thereafter set. An interrupt request or DMA request is then made to the computer bus and an acknowledgement message is sent on the outbound serial link. The processor or DMA controller responds to the request by reading the input register. When the input register is read, the input register full flag is reset.

DETAILED DESCRIPTION OF THE PREFERRED EMBODIMENT OF THE INVENTION

The IBM PC is a well known computer and is described in the previously discussed reference manual. The PC is fairly typical of bus oriented computers.

Another type of computer is the T424 or Transputer distributed by the INMOS Corporation, located in Bristol England. The computer is described in the reference "IMS T424 transputer reference manual" available from the INMOS Corporation.

Figure 1:
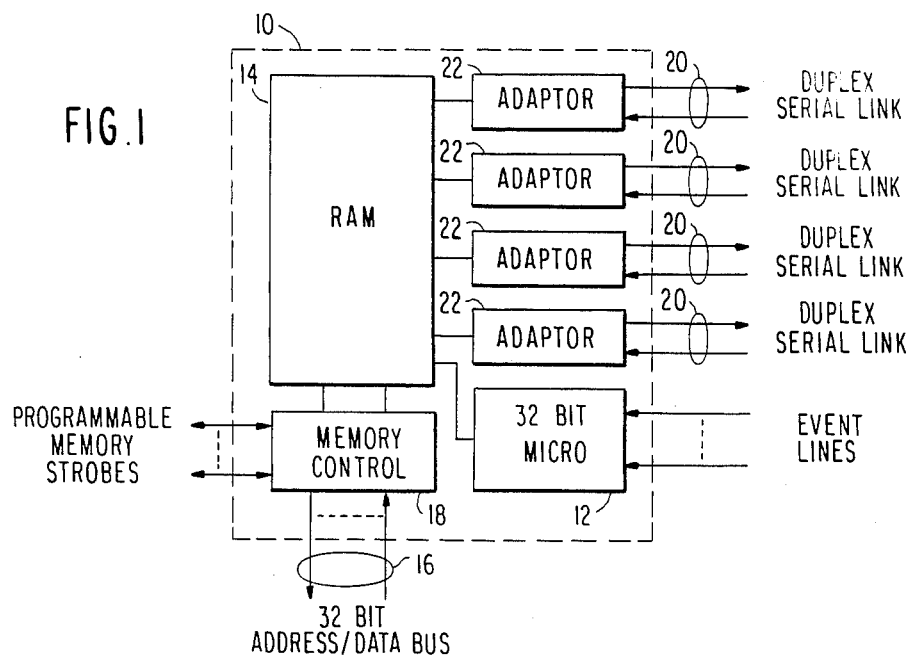
FIG. 1 is a block diagram of the architecture of a T424 computer, designed for communicating over serial links.

The general architecture of a T424 computer 10 is shown in FIG. 1. A 32-bit microprocessor 12 processes 10 million instructions per second. However, the instructions are restricted to a reduced intruction set (RISC). A fast on-chip memory 14 consists of a 1K×32 50 ns static RAM. Thus the computer can operate at a fast micro cycle rate of 50 ns. A 32-bit address/data bus 16 accesses the chip at 25 megabytes per second through a memory control 18. Four high-speed duplex serial links 20 are connected to the computer 10 through adaptors 22 which operate at 20 megabits per second. A hardware process scheduler, not shown, controls the operation of the computer 10. The internal architecture of the computer 10 provides atomic instructions for the control of the serial links 20. Each of these links 20 is indepent and thus permits simultaneous communications with other T424s or other devices. The T424 "assembly" language OCCAM provides primitive data abstractions, called channels, that are used to manipulate the serial links 20. Hence, no extra layers of software need be written to provide a software interface to the links 20.

It is thus seen that the T424 is a simple but very fast computer. It would be useful to interface one or more T424s to a PC, particularly for the off-loading of tasks. However such a connection would require an interface in view of the the differences in architecture and communication protocols between the PC and the T424.

Figure 2:
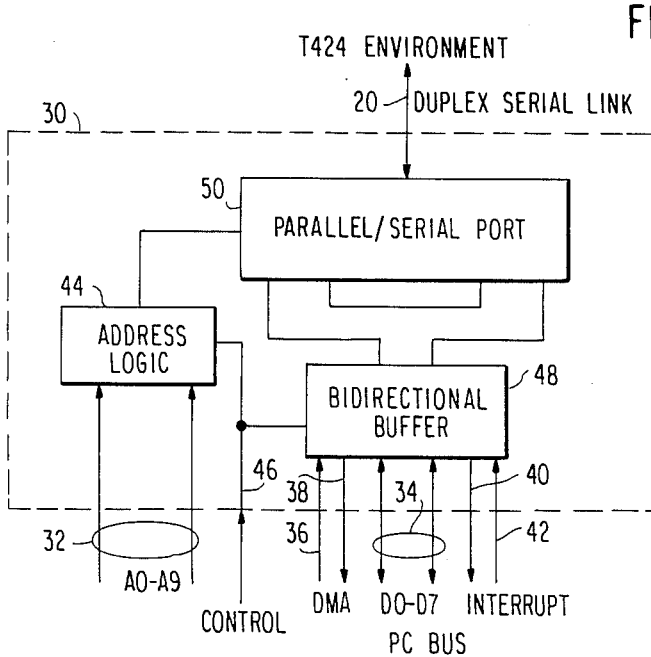
FIG. 2 is a generalized block diagram of an embodiment of the interface of the invention.

Shown in FIG. 2, is a generalized block diagram of an interface 30 of the invention for interfacing a T424 on one side and an IBM PC on the other. On the T424 side, the interface 30 is connected only to one duplex serial link 20. On the PC side, the interface 30 is connected to various parts of the PC bus. In particular, it is connected to the lowest ten bits $A_0$–$A_9$ of the address bus of the bus. It is also connected to all the bits $D_0$–$D_7$ of the data bus 34 of the PC bus. For control purposes, the interface 30 is connected to the DMA request line 36 and the DMA acknowledgement line 38 of the PC bus. It is also connected to the interrupt request line 40 of the PC bus and to an interrupt acknowledgement line 42. The interrupt acknowledgement line 42 is not part of the PC bus but could be easily implemented by intermediate hardware. Finally the interface 30 is connected to various control lines 46 of the PC bus which are involved with the operation of the address bus 32 and the data bus 34.

Figure 3:
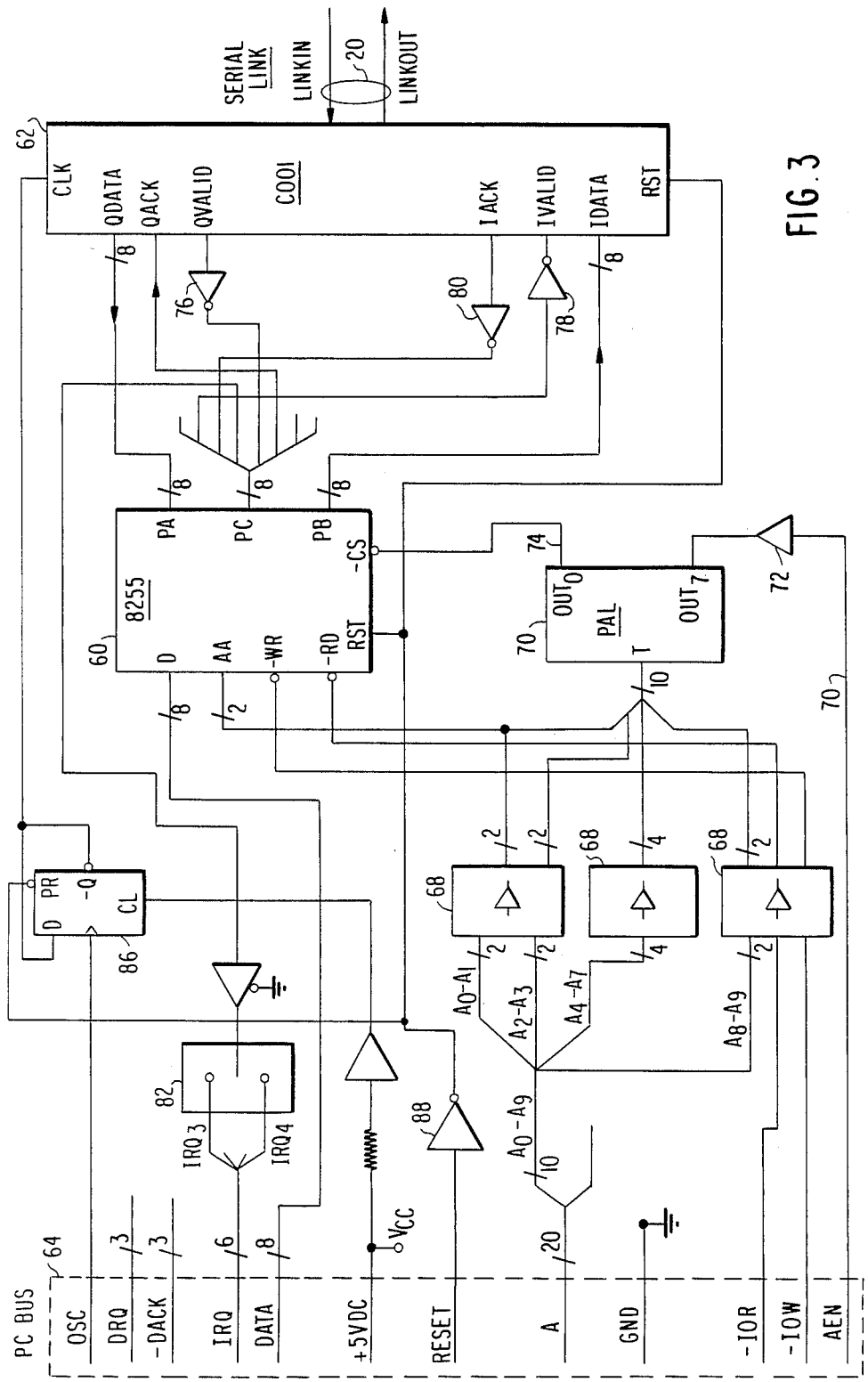
FIG. 3 is a detailed schematic diagram of an embodiment of the interface of the invention.

The interface 30 behaves, as far as the PC is concerned, as an I/O port. The address bus 32 selects the interface 30 as one of the I/O ports connected to the PC bus. The interface 30 can be accessed by either the processor or the DMA controller of the PC, both of which can issue I/O read and write commands to the PC bus A detailed schematic of an embodiment of the invention is shown in FIG. 3. In this embodiment, only the PC processor can access the interface so that the DMA connections to the PC bus are not completed.

This embodiment relies upon two complex integrated circuits. The first is an 8255 programmable peripheral interface 60. The 8255 is distributed by the Intel Corporation as part type 8255A. It is also distributed by the NEC Corporation.

Figure 4:
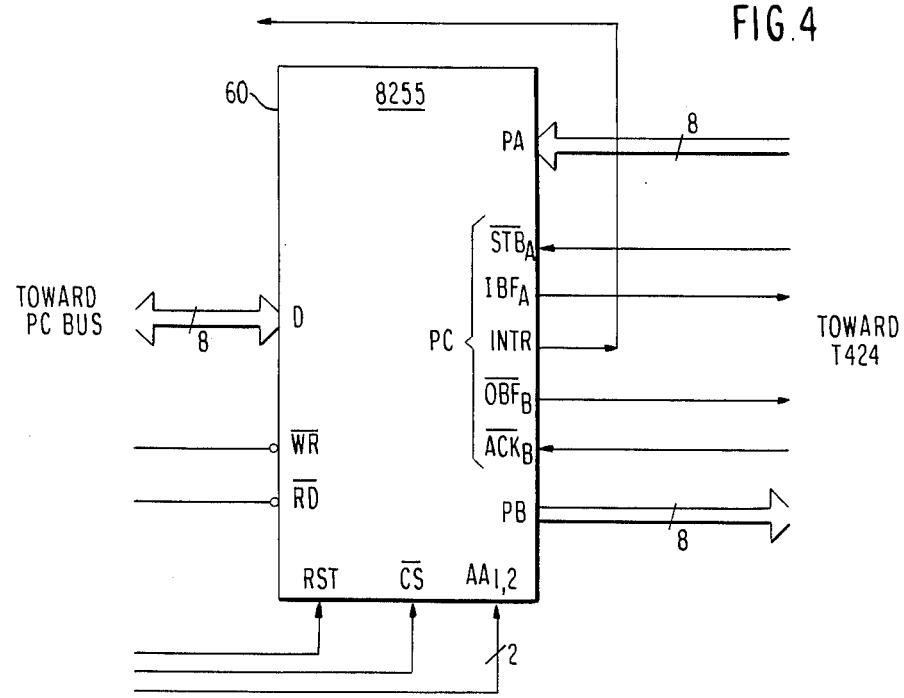
FIG. 4 is a pin and signal diagram of an 8255 adaptor.

The 8255 is a buffer and data switch for 8-bit wide data buses. On one side of the 8255 is an 8-bit bidirectional D-port. On the other side are three 8-bit ports, called respectively ports PA, PB, and PC. The 8255 can be programmed by a control word read into the D-port. In this embodiment, the 8255 is operated in Mode 1 by use of the control word $D_7$–$D_0$=1011X10X, where the value of X is immaterial. In this configuration, the port PA is an input data port, port PB is an output data port and port PC is used for a combination of input and output control signals. Data enters the 8255 on the D-port from the PC or the port PA from the T424 and is buffered before being output on the port PB to the T424 or the D-port to the PC. The connections to the 8255 in this configuration are shown in more detail in FIG. 4.

The D-port receives and outputs data to the PC bus. The input port A receives data ultimately from the T424. The output port B transmits data toward the T424. All the control terminals shown on the left are terminals of the port C. An inverted strobe A input $-STB_A$ causes data present on the inputs to port A to be loaded into an input latch of the 8255 when $-STB_A$ is pulsed low. An input buffer-A full output signal $IBF_A$ outputs a high to indicate that data is loaded into the input latch. The input buffer full signal $IBF_A$ is reset by the rising edge of the $-RD$ input to be described later. An interrupt request output INTR can be used to interrupt a processor when the input latch has been filled. This signal is set when $-STB_A$ is high and $IBF_A$ is high. It is reset by the falling edge of $-RD$ to be described later. All of these controls are associated with the input port PA.

Associated with output port PB is an inverted output buffer-B full signal $-OBF_B$. This signal will go low to indicate that data has been written through the D-port to an output buffer in the 8255. The signal $-OBF_B$ will be set by the rising edge of the $-WR$ signal and reset by an $-ACK_B$ signal being low. An acknowledgement input signal $-ACK_B$ is sent by a peripheral device to the 8255 to acknowledge that data from the output port PB has been received. As a result, the output buffer-B full signal $-OBF_B$ is reset.

Associated with the D-port is an inverted write input $-WR$, which is used by the PC to write data into the D-port from the PC data bus 34. An inverted read input $-RD$ is used by the PC to read data from the D-port onto the data bus 34.

A reset input RST is used to initialize the 8255 and an inverted chip select $-CS$ is used to select the 8255 for operation when the I/O address set for the interface matches the address on the PC address bus 32. Two address inputs $AA_0$ and $AA_1$ are used by the PC bus to access the 8255 for different tasks. The effect is that the 8255 is treated as differently addressed ports for reading from port A, for writing to port B, for reading the control bits on port C, and for writing the control word.

Figure 5:
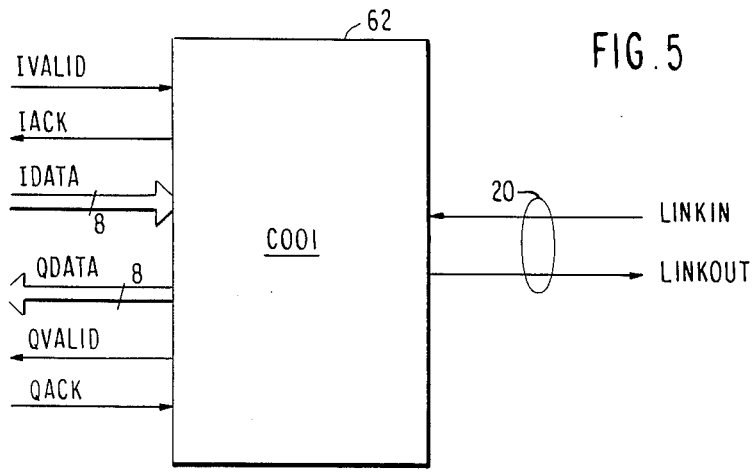
FIG. 5 is a pin and signal diagram of a C001 adaptor.

The second complex integrated circuit used in this embodiment of the invention is the C001 link adaptor 62 which is distributed by the INMOS Corporation and is described in the previously described "IMS T424 transputer reference manual". The basic operation of the C001 is described with reference to FIG. 5. The C001 receives one full duplex serial link 20 consisting of an inbound link LINKIN and an outbound link LINKOUT. Thus the C001 can be directly connected with the T424. The C001 receives packets on the inbound link LINKIN, extracts a byte of data from the packet and outputs the byte in parallel on a bus QDATA. Conversely, the C001 receives a parallel byte of data on a bus IDATA, serializes the data and encloses it in a packet for transmission on the outbound link LINKOUT.

Different communication protocols are observed on the two sides of the C001. On the serial link side, the conventions of the serial link are observed. That is, once a packet has been sent on one of the half-duplex links LINKIN or LINKOUT, another packet is not sent until an acknowledgement packet has been received on the other of the half-duplex links LINKOUT or LINKIN. This convention is observed both by the C001 and by the adaptors 22 in the T424. On the parallel bus side, the C001 operates in a full handshaking mode. Data must be made valid on the connecting data bus QDATA or IDATA by the originating device and then the originating device signals the validity of the data on a data valid line IVALID or QVALID. When the receiving device has latched the data or otherwise disposed of it, the receiving device issues an acknowledgement signal IACK or QACK. This convention is observed both by the C001 and by the 8255 as it is configured in the present invention.

The C001 operates from an internally generated clock signal that is much faster than a clock signal input. The serially transmitted data is transmitted at the internal clock rate which is much faster than the clock rate of the PC bus. However, the C001 receives serial data asynchronously. Serial transmission and reception are independent and may be simultaneous.

Referring again to FIG. 3, a serial link convention is maintain to the left of the C001 adaptor 62, a handshaking protocol is observed between the C001 adaptor 62 and the 8255 interface 60, and the PC bus conventions apply to the left of the 8255 interface 60.

Selected parts of a PC bus 64 are explicitly shown. The PC data bus 64 is connected to the D-port of the 8255 interface 60. The low-order PC address bus 32 is connected to low-order lines of the full PC address bus 66. The high-order address lines are not required in addressing the limited number of I/O ports available in the PC architecture. The low-order PC address bus 32 is buffered by three buffers 68, such as the part type AS244. The two lowest-order address lines $A_0$ and $A_1$ are connected to the address inputs $AA_0$ and $AA_1$ of the 8255 adaptor 60. All the address lines $A_0$–$A_9$ are connected to a programmable logic array (PAL) 70 such as a 16L8, available from either National Semiconductor or Texas Instrument. The PAL 70 is used to decode the I/O port addresses specific to this interface. Four consecutive port addresses are used for the different functions of the interface, as described previously. An address enable signal AEN from the PC bus 64 is carried on line 70 and is buffered by another buffer 72, such as an AS244 and connected to the PAL 70. Note that the address enable line 70 is connected to an output of the PAL 70. In a PAL, inputs and outputs can be interchanged depending upon the programming of the PAL. The PAL 70 is programmed such that four selected sequential patterns of the address bits $A_0$–$A_9$ and a high address enable signal AEN on the line 70 will produce a low output on a chip select control line 74, connected to the inverted chip select input $-CS$ of the 8255 adaptor 60. If this pattern is not present, the address enable output 70 is high and the 8255 adaptor 60 is not selected.

Turning now to the data connections between 8255 adaptor 60 and the C001 adaptor 62, the input port A of the 8255 adaptor 60 is connected in parallel to the output port QDATA of the C001 adaptor 62. Likewise, the output port B of the 8255 adaptor 60 is connected in parallel to the input port IDATA of the C001 adaptor 62. In regard to the control connections between the 8255 and the C001, the connections are shown in the following table and will then be explained.

TABLE

| 8255 Pin | 8255 Function | 8255 I/O Invert | C001 Input | PC Line |
|---|---|---|---|---|
| $PC_1$ | $-OBF_B$ | O | Yes | IVALID |
| $PC_2$ | $-ACK_B$ | I | Yes | IACK |
| $PC_3$ | $INTR_A$ | O | No | IRQ |

TABLE-continued

| 8255 Pin | 8255 Function | 8255 I/O Invert | C001 Input | PC Line |
|---|---|---|---|---|
| PC$_4$ | $-STB_A$ | I | Yes | QVALID |
| PC$_5$ | IBFA | O | No | QACK |

The strobe-A input $-STB_A$ or PC$_4$ of port C of the 8255 adaptor is connected through an inverter 76 to the QVALID output of the C001 adaptor 62. The input buffer-A full output IBF$_A$ or PC$_5$ of the 8255 adaptor 60 is directly connected to the QACK input of the C001 adaptor 62. The inverted output buffer-B full output $-OBF_B$ or PC$_1$ of the 8255 adaptor 60 is connected through an inverter 78 to the IVALID input of the C001 adaptor 62. The inverted acknowledgement B input $-ACK_B$ or PC$_2$ is connected through an inverter 80 to the IACK output of the C001 adaptor 62. The inverters 76-80 may all be 7404s.

For the control connections of the 8255 to the PC bus side, the interrupt request output INTR$_A$ or PC$_3$ of the 8255 adaptor 60 is connected through another buffer to a switch 82. The switch 82 may be set to one of the interrupt levels of the PC bus such as interrupt level 3 or interrupt level 4. The processor of the PC must be programmed to recognize an interrupt on the selected level as originating from this interface. The final control connections are the connections of the inverted I/O read $-IOR$ and the inverted I/O write $-IOW$ on the PC bus 64 to $-RD$ and $-WR$ inputs respectively of the 8255 adaptor 60.

Also included in the interface is a divide-by-2 clock 86 which can be implemented by a 7474 flip-flop. The flip-flop 86 receives on its clock input a clock signal from the OSC line of the PC bus 64. The clock signal on the OSC line is three times faster than the operation rate on the PC. The $-Q$ output of the flip-flop is both fed back to the D input and also to the CLK input of the C001 adaptor 62. Thus the C001 adaptor 62 is being clocked by the PC bus. This synchronous operation is not required but is felt to remove possible timing problems. A reset line RESET of the PC bus 64 is connected through an inverter 88 to the $-PR$ input of the flip-flop 86, to the RST input of the 8255 adaptor 60 and to the RST input of the C001 adaptor 62. This connections allow for proper initialization upon start up of the PC bus.

The interface of this embodiment of the invention can handle two types of data transfers, the transfer of a byte of data from the T424 to the processor of the PC bus and the transfer of a byte of data from the PC processor to the T424. Each will be described.

When the T424 wishes to send a byte of data, an adaptor 22 in the T424 serializes the data and inserts it into the packet. The adaptor 22 will not send the packet on the outbound serial link 20 until it has received an acknowledgement packet on the inbound serial link 20 for the previously sent message. Presuming that there is no outstanding acknowledgement, the adaptor 22 sends the packet to the LINKIN input of the C001 adaptor 62 which deserializes and latches the byte of data.

For the moment, assume that the input buffer on the 8255 adaptor 60 is empty so that IBF$_A$ is low and the QACK input to the C001 adaptor 62 is also low. In this case, the C001 adaptor 62 validates the byte of data on the QDATA bus and raises QDATA bus from the C001 adaptor 62 to be latched into the input latch of the 8255 adaptor 60. Thereafter the input buffer A full signal IBF$_A$ goes high since the input buffer has been filled with the byte from the C001 adaptor 62. This causes the acknowlegement input QACK to the C001 adaptor 62 to go high, thus acknowledging receipt of the byte. In turn, the C001 adaptor 62 sends an acknowledgement packet to the adaptor of the T424 so that further serial messages can be sent. The receipt at the C001 adaptor 62 of the high acknowledgement input QACK causes the data on the QDATA bus to be invalidated and the QVALID signal to go low. The resultant raising of the inverted strobe-A input $-STB_A$ causes the 8255 adaptor 60 to raise its interrupt output INTR$_A$ high. This high level is maintained until the next read signal $-RD$ from the processor.

If, however, the input buffer of the 8255 adaptor 60 was full when the C001 adaptor 62 was attempting to transmit a byte of data to it, then no subsequent read signal $-RD$ has emptied the input buffer. In this case, the input buffer-A full output IBF$_A$ remains high and the acknowledgement input QACK to the C001 adaptor 62 remains low. The lack of an acknowledgement from a previous byte causes the C001 adaptor 62 to not validate data on the QDATA bus although the data remains latched internally.

The processor attached to the PC bus eventually responds to a high INTR$_A$ signal, attached to one of the interrupt request lines of the PC bus, by issuing a read I/O command to the port address of the interface. This I/O read causes the I/O read signal $-IOR$ on the PC bus to go low and thus causes the inverted read signal $-RD$ at the 8255 to go low. The 8255 adaptor 60 responds to a low $-RD$ signal by validating the data in its input buffer onto the D-bus and removing the high interrupt signal INTR$_A$. Thereafter, the input buffer A full signal IBF$_A$ goes low and the acknowledgement input QACK to the C001 adaptor 62 is lowered. The lowering of the acknowledgement input QACK is required for the C001 adaptor 62 to validate the next byte of data on the QDATA bus.

In the other type data transfer, the processor attached to the PC bus writes a byte of data which is eventually sent to the T424. The processor, subject only to software control, determines when it wants to write to the interface. The processor validates the byte of data on the data bus 34 of the PC bus, which presents the 8255 adaptor 60 with valid data on its D-bus. The processor addresses the interface on the address bus 32 and then lowers the bus write line $-IOW$ and thus lowers the inverted write signal $-WR$ which causes the data to be latched into an output latch on the 8255 adaptor 60. When the $-WR$ signal rises, the inverted output buffer B full signal $-OBF_B$ goes low which causes the IVALID input of the C001 adaptor 62 to go high. The data in the output buffer is immediately validated on the port B.

The C001 adaptor 62, upon receiving a high IVALID input immediately proceeds to serialize the data on the IDATA bus, convert it into packet format and begin transmitting the packet on the outbound serial link LINKOUT. When the adaptor 22 at the T424 has, at least, begun receiving the packet, it responds with an acknowledgement packet on the serial link LINKIN. When the C001 adaptor 62 completes the reception of the acknowledgement packet, it raises its acknowledgement output IACK to a high value. Thus the acknowledgement B input $-ACK_B$ is lowered so that the 8255 adaptor 60 knows that its output data has been received by the T424. Thereafter, the 8255 invalidates its output data and raises is inverted output buffer-B full signal $-OBF_B$.

As should be apparent from the above description, there is no handshaking between the T424 and the processor for writing to the T424. This embodiment thus relies on the fact that the T424 is much faster than the PC bus and will accept data as fast as the PC bus can write it. On the other hand, the T424 requires that the processor read the data buffered in the 8255 before the T424 proceeds further. Actually an intermediate byte is latched in the C001 waiting transfer to the 8255. But the speed of the different accesses is limited by the PC bus.

However the handshaking protocol is observed between the 8255 adaptor 60 and the C001 adaptor 62. That is, when one adaptor wishes to transfer data to the other adaptor, it validates the data on a connecting data bus and notifies the other adaptor of the new valid data. When the other adaptor has received the data, it acknowledges to the sending adaptor that the data has been received so that the connecting data bus can be freed for new data.

Although the embodiment has been described for accesses by the processor to the interface, the interface could easily be modified for accesses by the DMA controller. In this case, instead of an interrupt request, the interface would activate a line for a DMA request. The DMA controller issues the same type of read and write commands to I/O ports as is done by the processor.

Having thus described our invention, what we claim as new, and desire to secure by Letters Patent is:

1. A communication interface between a first communication system which reads and writes blocks of data to a port over a parallel data bus, said bus and said port being controlled by a processor, and a second communication system which sends and receives blocks of data over a full duplex link, said second communication system requiring an acknowledgement of receipt of a block of data previously sent before said second communication system will send a subsequent block of data, said interface comprising:
   first means connected to said parallel data bus for having blocks of data being read from and being written to by said processor;
   second means connected to said full duplex link for receiving and sending blocks of data to and from said second communication system; and
   control means connected between said first and second means for transferring data therebetween under a full handshaking protocol, wherein when either said first or second communications system tries to send data to the other, said control means notifies said first or second communication system if said corresponding first or second means is able to receive said data, said control means converts said data according to the protocol of the receiving communication system, transfers the data between said first and second means, sends said data to the receiving communication system, and receives an acknowledgement of receipt of said data from said receiving communication system.

2. An interface between a first communication system communicating on a bus and a second communication system communicating on a full duplex link, comprising:
   means for receiving a first block of data from said second communication system over said bus;
   first means for storing said received first block;
   means for notifying said first communication system over said bus upon the storing of said first block;
   means for reading said stored first block from said bus;
   means for acknowledging said reading of said stored first block to said second communication system over said link;
   second means for storing said stored first block;
   means for writing a second block of data from said first communication system over said bus to said second storing means;
   means for sending said second block of data from said second storing means to said second communication system over said serial link; and
   means for receiving an acknowledgement from said second communication system over said link of the receipt of said sent second block.

3. An interface as recite in claim 2, wherein said reading means and said writing means are responsive to a single reading operation and a writing operation of an instruction set of a processor compatible for attachment to said bus.

4. An interface as recited in claim 2, further including address recognizing means for recognizing an address on an address portion of said bus and wherein said reading and writing means are responsive to said address recognizing means.

5. An interface as recited in claim 2, wherein said receiving means includes third means for storing said first block of data and further comprising control means for transferring said first block from said third storing means to said first storing means under a handshaking protocol.

6. An interface as recited in claim 5, wherein said control means includes first signalling means activated by the storage of said first block in said third storing means and second signalling means activated by the reading of said first block by said reading means, said first signalling means activating said notifying means and said second signalling means activating said acknowledging means.

7. An interface as recite in claim 5, further comprising third signalling means activated by the storage of said second block in said second storage means for activating said sending means.

8. A communication interface between a first communication system which reads and writes blocks of data to a port over a parallel data bus, said bus and said port being controlled by a processor, and a second communication system which sends and receives blocks of data over a full duplex link, said second communication system requiring an acknowledgement of receipt of a block of data previously sent before said second communication system will send a subsequent block of data, said first communication system being connected to said interface through the address bus, the data bus, the DMA request and acknowledge lines, the interrupt request line and the control lines of said parallel data bus and to an interrupt acknowledgement line, said interface comprising:
   first means connected to said parallel data bus for having blocks of data being read from and being written to by said processor;
   second means connected to said full duplex link for receiving and sending blocks of data to and from said second communication system; and control means connected between said first and second means for transferring data therebetween under a full handshaking protocol, wherein:

in order for said control means to transfer data from said first communication system to said second communication system, said control system determines using said address bus when said first communication system is trying to address said communication interface, then writes into said first means from said parallel data bus via said data bus using the protocols of said data bus, reformates the data written into said first means according to the serial protocol and sends said data to said second communication system over said full duplex serial link, and in order for said control system to tranfer data from said second communication system to said first communication system, said second communication system sends a block of data over half of said full duplex link to said second means using said serial protocol and said second means sends an acknowledgement to said second communication system if said second means contains no previous blocks of data, said control means converts said block of data from serial to parallel form and sends a signal to said first communication system on said interrupt request line and said processor responds by sending a signal back to said control means on said interrupt acknowledgement line and said first communication system reads said block of data from said control means.

* * * * *